(12) United States Patent
Shimomaki

(10) Patent No.: US 9,733,352 B2
(45) Date of Patent: Aug. 15, 2017

(54) POSITIONING SYSTEM AND METHOD

(71) Applicant: Kabushiki Kaisha Toshiba, Minato-ku (JP)

(72) Inventor: Hirokazu Shimomaki, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 683 days.

(21) Appl. No.: 14/321,939

(22) Filed: Jul. 2, 2014

(65) Prior Publication Data

US 2015/0247929 A1   Sep. 3, 2015

(30) Foreign Application Priority Data

Feb. 28, 2014  (JP) .................................. 2014-039136

(51) Int. Cl.
| | | |
|---|---|---|
| G01S 13/58 | (2006.01) | |
| G01S 7/28 | (2006.01) | |
| G01S 7/40 | (2006.01) | |
| G01S 13/00 | (2006.01) | |
| G01S 13/18 | (2006.01) | |
| G01S 13/70 | (2006.01) | |
| G01S 13/86 | (2006.01) | |

(52) U.S. Cl.
CPC .............. G01S 13/582 (2013.01); G01S 7/28 (2013.01); G01S 7/40 (2013.01); G01S 13/003 (2013.01);
(Continued)

(58) Field of Classification Search
CPC . G01S 7/28; G01S 7/40; G01S 13/003; G01S 13/18; G01S 13/581; G01S 13/582; G01S 13/70; G01S 13/86
See application file for complete search history.

(56) References Cited

U.S. PATENT DOCUMENTS 5,359,575 A    10/1994  Williams et al.
2003/0048224 A1  3/2003  Benner et al.
(Continued)

FOREIGN PATENT DOCUMENTS

GB    2 250 154 A    5/1992
JP    58-200179 A    11/1983
(Continued)

OTHER PUBLICATIONS

English Translation of IDS document JP 2010-204054 A.*
(Continued)

*Primary Examiner* — Bernarr Gregory
*Assistant Examiner* — Fred H Mull
(74) *Attorney, Agent, or Firm* — Oblon, McClelland, Maier & Neustadt, L.L.P.

(57) ABSTRACT

According to an embodiment, positioning system includes transmitter apparatus transmits radio wave and receiver apparatus receives target echo. Transmitter apparatus comprises first receiver and transmitter. First receiver receives GPS signal and outputs reference signal. Transmitter transmits radio wave at time interval based on reference signal. The receiver apparatus includes second receiver, detector and first and second calculators. Second receiver receives GPS signal and outputs time information. Detector receives target echo and outputs reception signal added received time information. First calculator calculates Doppler frequency based on reception frequency and transmission frequency. Second calculator calculates time difference of echo based on Doppler frequency. Detector sets time filter to receive next pulse based on time difference and time information of reception signal.

6 Claims, 5 Drawing Sheets

(52) U.S. Cl.
CPC .............. *G01S 13/18* (2013.01); *G01S 13/70* (2013.01); *G01S 13/86* (2013.01)

(56) References Cited

U.S. PATENT DOCUMENTS

| | | |
|---|---|---|
| 2004/0233105 A1 | 11/2004 | Benner et al. |
| 2008/0158061 A1* | 7/2008 | Greverie ............... G01S 13/003 342/453 |
| 2014/0059987 A1 | 3/2014 | Hirakawa et al. |

FOREIGN PATENT DOCUMENTS

| | | |
|---|---|---|
| JP | 3-65992 U | 6/1991 |
| JP | 2962983 | 10/1999 |
| JP | 2000-230975 A | 8/2000 |
| JP | 2004-535564 A | 11/2004 |
| JP | 2005-513412 A | 5/2005 |
| JP | 2006-105897 A | 4/2006 |
| JP | 2010-204054 A | 9/2010 |
| JP | 2010-230448 A | 10/2010 |
| JP | 2014-2109 A | 1/2014 |
| JP | 2014-6104 A | 1/2014 |
| JP | 2014-20820 A | 2/2014 |
| JP | 2014-50793 A | 3/2014 |
| WO | WO 2008/058770 A1 | 5/2008 |

OTHER PUBLICATIONS

Japanese Office Action issued Mar. 1, 2016 in Patent Application No. 2014-039136 (with English Translation).
Extended Search Report issued Jul. 6, 2015 in European Patent Application No. 14174729.5.

* cited by examiner

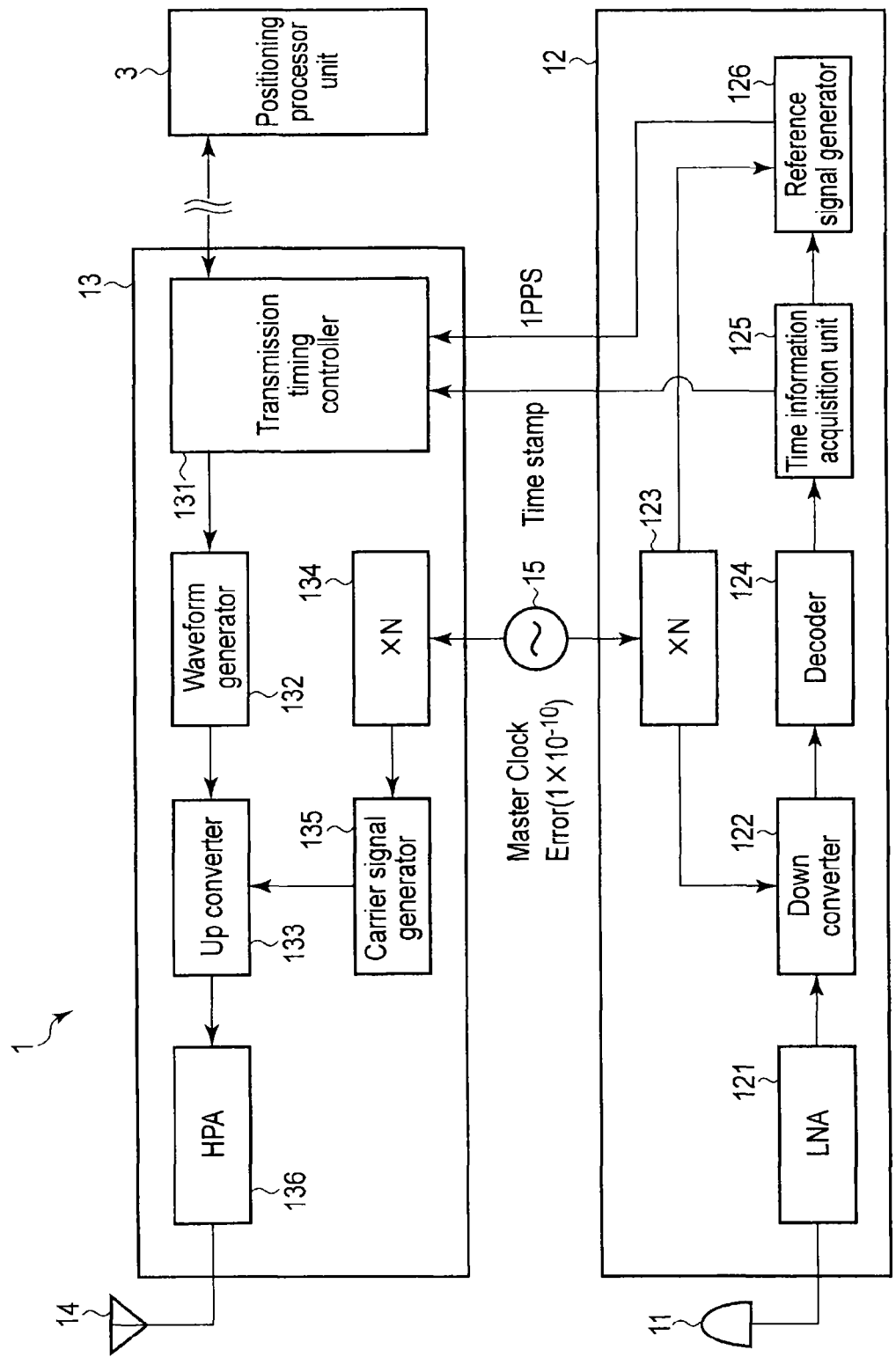
F I G. 2

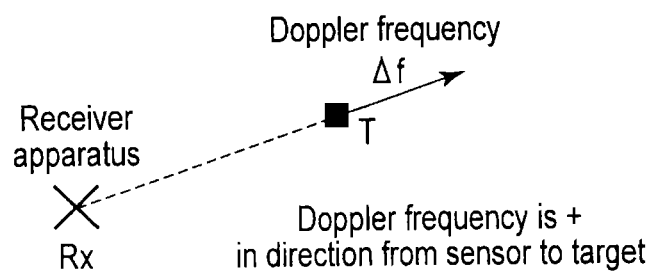
F I G. 4

POSITIONING SYSTEM AND METHOD

CROSS-REFERENCE TO RELATED APPLICATIONS

This application is based upon and claims the benefit of priority from the Japanese Patent Application No. 2014-039136, filed Feb. 28, 2014, the entire contents of which are incorporated herein by reference.

FIELD

Embodiments described herein relate generally to a positioning system and method for estimating the position of a target such as an aircraft.

BACKGROUND

A Multi-Static Primary Surveillance Radar (MSPSR) includes a transmitter and a plurality of receivers. The transmitter radiates a pulsed radio wave. Each receiver receives a reflected wave (echo signal) returned from a target. The position (range) of the target can be estimated by performing elliptical positioning for each receiver based on the time difference between transmission and reception. The target can be specified by hyperbolic positioning between a plurality of transmission/reception channels using the combinations of the transmitter and the receivers.

In some cases, the receiver cannot correctly receive the reflected wave because of the reception environment, reception sensitivity, or the like. This leads to deterioration of the observation accuracy and tracking performance and errors in position estimation. It is demanded to cope with these problems.

BRIEF DESCRIPTION OF THE DRAWINGS

FIG. 2 is a functional block diagram showing an example of a transmitter apparatus 1 shown in FIG. 1;

FIG. 4 is a view for explaining a Doppler frequency; and

DETAILED DESCRIPTION

In general, according to one embodiment, a positioning system includes a transmitter apparatus and a receiver apparatus. The transmitter apparatus transmits a radio wave. The receiver apparatus receives a reflected wave from a target. The transmitter apparatus comprises a first GPS receiver and a transmitter. The first GPS receiver receives a GPS (Global Positioning System) signal and outputs a reference signal. The transmitter transmits the radio wave at a predetermined time interval based on the reference signal. The receiver apparatus includes a second GPS receiver, a detector, a Doppler frequency calculator, and an arrival time difference calculator. The second GPS receiver receives the GPS signal and outputs time information. The detector receives the reflected wave and outputs a reception signal to which the received time information is added. The Doppler frequency calculator calculates a Doppler frequency based on a reception frequency of the reception signal and a transmission frequency of the radio wave. The arrival time difference calculator calculates an arrival time difference of the reflected wave based on the Doppler frequency. The detector sets a time filter to receive a next pulse based on the arrival time difference and the time information added to the reception signal.

Various embodiments will be described hereinafter with reference to the accompanying drawings.

Figure 1:
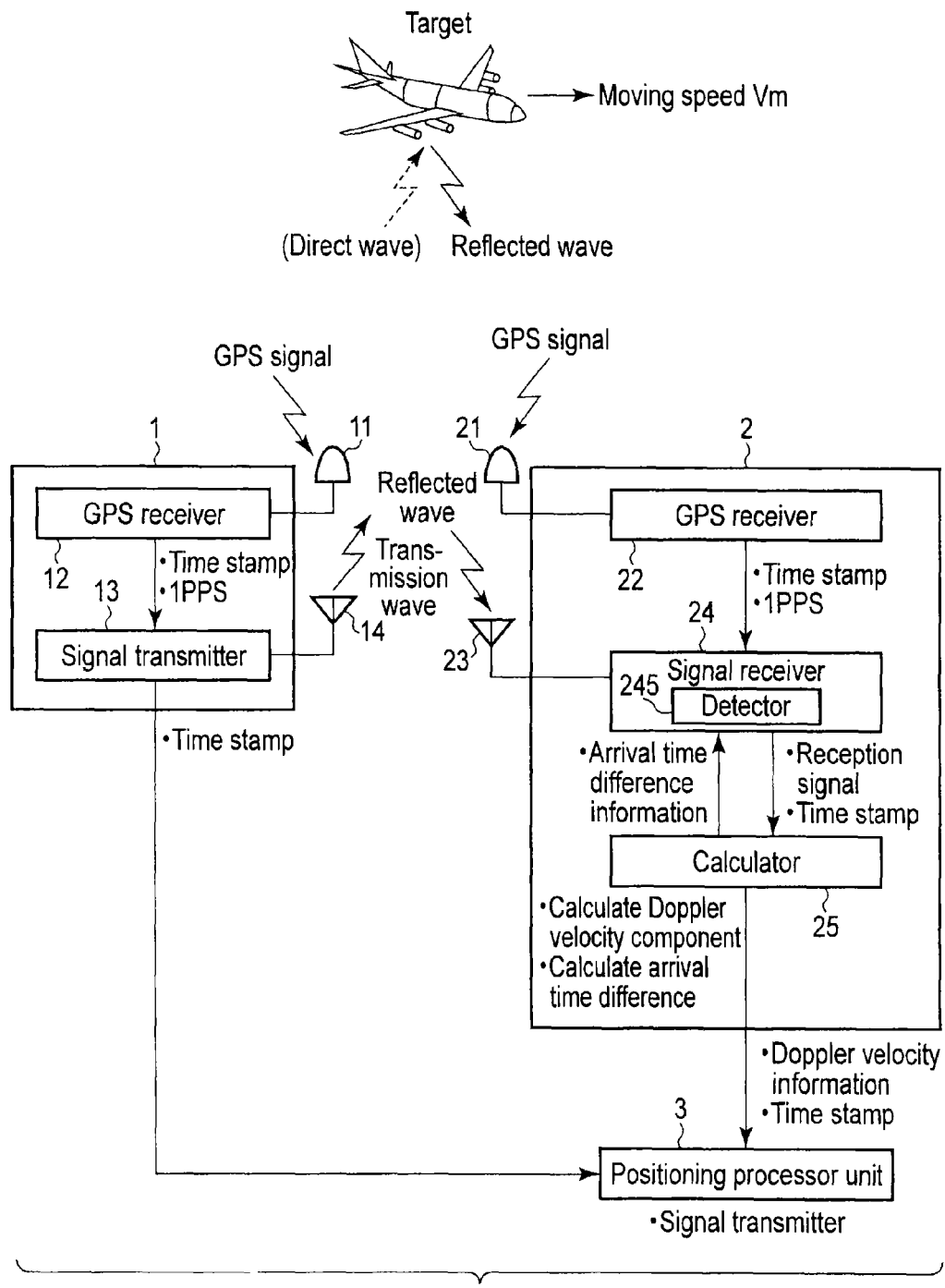
FIG. 1 is a view showing an example of a positioning system according to an embodiment.

FIG. 1 is a view showing an example of a positioning system according to an embodiment. This positioning system includes a transmitter apparatus 1, a receiver apparatus 2, and a positioning processor unit 3. The transmitter apparatus 1 and the receiver apparatus 2 are communicably connected to the positioning processor unit 3 via a network. The transmitter apparatus 1 transmits a pulsed radio wave to a target. The receiver apparatus 2 receives a reflected wave from the target. The positioning processor unit 3 estimates the position of the target.

A system including the transmitter apparatus 1 and the receiver apparatus 2 is a so-called bi-static system. A system having a plurality of combinations of the transmitter apparatus 1 and the receiver apparatuses 2 is a so-called multi-static system. A bi-static system will be described here for the sake of simplicity.

The transmitter apparatus 1 includes a GPS (Global Positioning System) antenna 11, a GPS receiver 12, a signal transmitter 13, and a transmission antenna 14. The GPS receiver 12 receives a GPS signal from a GPS satellite by the GPS antenna 11, and outputs a time stamp and a 1 PPS (Pulse Per Second) signal to the signal transmitter 13. In many cases, the time stamp corresponds to the time at which the GPS signal is received.

The signal transmitter 13 radiates radio waves from the transmission antenna 14 at a predetermined time interval. The radio wave transmission timing is controlled based on the 1 PPS signal output from the GPS receiver 12. The signal transmitter 13 notifies the positioning processor unit 3 of the radio wave transmission time using the time stamp.

The 1 PPS signal is a reference signal transmitted from the GPS satellite once a second, and is used as the radio wave transmission time synchronization signal of the signal transmitter 13. The accuracy of the 1 PPS signal depends on the time accuracy of the GPS satellite. Since the time accuracy of the GPS satellite is very high, the time accuracy of the 1 PPS signal is very high as well. When the 1 PPS signal serves as a time correction signal in the GPS receiver 12, an accurate time stamp can be output.

The receiver apparatus 2 includes a GPS antenna 21, a GPS receiver 22, a receiving antenna 23, a signal receiver 24, and a calculator 25. The GPS receiver 22 receives a GPS signal from a GPS satellite by the GPS antenna 21, and outputs a time stamp and a 1 PPS signal to the signal receiver 24, like the GPS receiver 12.

The receiving antenna 23 of the signal receiver 24 catches a reflected wave from a target and outputs an excitation signal. A detector 245 detects the excitation signal and generates a reception signal. The detector 245 also adds reception time information to the reception signal using a time stamp from the GPS receiver 22.

The calculator 25 calculates a Doppler velocity component (including a Doppler frequency) based on the difference between the frequency of the reception signal and the frequency of the transmission wave using the frequency information of the frequency information sent from the signal receiver 24. The calculator 25 also estimates, based on the Doppler velocity component, time information at which the reflected wave from the target arrives next. Additionally, the calculator 25 measures the difference (arrival time difference) between the estimated arrival time and the actual pulse arrival time. The measured arrival time difference is sent to the detector 245 in the signal receiver 24 as arrival time difference information.

The positioning processor unit 3 receives the Doppler velocity component calculated by the calculator 25 and the time stamp added to the reception signal from the receiver apparatus 2 via the network. The positioning processor unit 3 estimates the position of the target by elliptical positioning using two focal points based on the transmission time information (time stamp) and the reception time information (time stamp).

The detector 245 of the signal receiver 24 receives the arrival time difference information from the calculator 25. Using the arrival time difference information, the detector 245 sets the time at which the next pulse arrives and performs reception processing by applying a time filter. The detector 245 calculates a time difference (preceding time difference) from previously received radio wave arrival time information, and uses the preceding time difference as a setting parameter of the time filter. Details of setting of the time filter will be described later.

FIG. 2 is a functional block diagram showing an example of the transmitter apparatus 1 shown in FIG. 1. The transmitter apparatus 1 includes the GPS receiver 12, the signal transmitter 13, and a master clock 15. In the GPS receiver 12, the GPS signal picked up by the GPS antenna 11 is amplified by a low noise amplifier (LNA) 121. The amplified GPS signal is down-converted by a down converter 122 and decoded by a decoder 124.

A time information acquisition unit 125 acquires a time stamp from the decoded GPS signal. A reference signal generator 126 generates a 1 PPS signal based on the acquired time stamp. A precision clock from the master clock 15 is multiplied by N by a multiplier 123 and given to the down converter 122 and the reference signal generator 126.

The signal transmitter 13 includes a transmission timing controller 131, a waveform generator 132, an up converter 133, a multiplier 134, a carrier signal generator 135, a high power amplifier (HPA) 136, and the transmission antenna 14.

The transmission timing controller 131 generates a transmission timing based on the 1 PPS signal output from the GPS receiver 12. The waveform generator 132 generates a transmission signal having a pulsed waveform at the transmission timing given by the transmission timing controller 131. The multiplier 134 gives the carrier signal generator 135 a clock generated by multiplying the precision clock from the master clock 15 by N. The carrier signal generator 135 generates a carrier signal using the given clock, and supplies the carrier signal to the up converter 133.

The up converter 133 up-converts the transmission signal from the waveform generator 132 to the radio frequency band using the supplied carrier signal. The transmission signal converted into the radio frequency is power-amplified by the high power amplifier (HPA) 136 and transmitted from the transmission antenna 14 as a radio wave. The transmission timing controller 131 notifies the positioning processor unit 3 of the radio wave transmission time using the time stamp from the GPS receiver 12.

Figure 3:
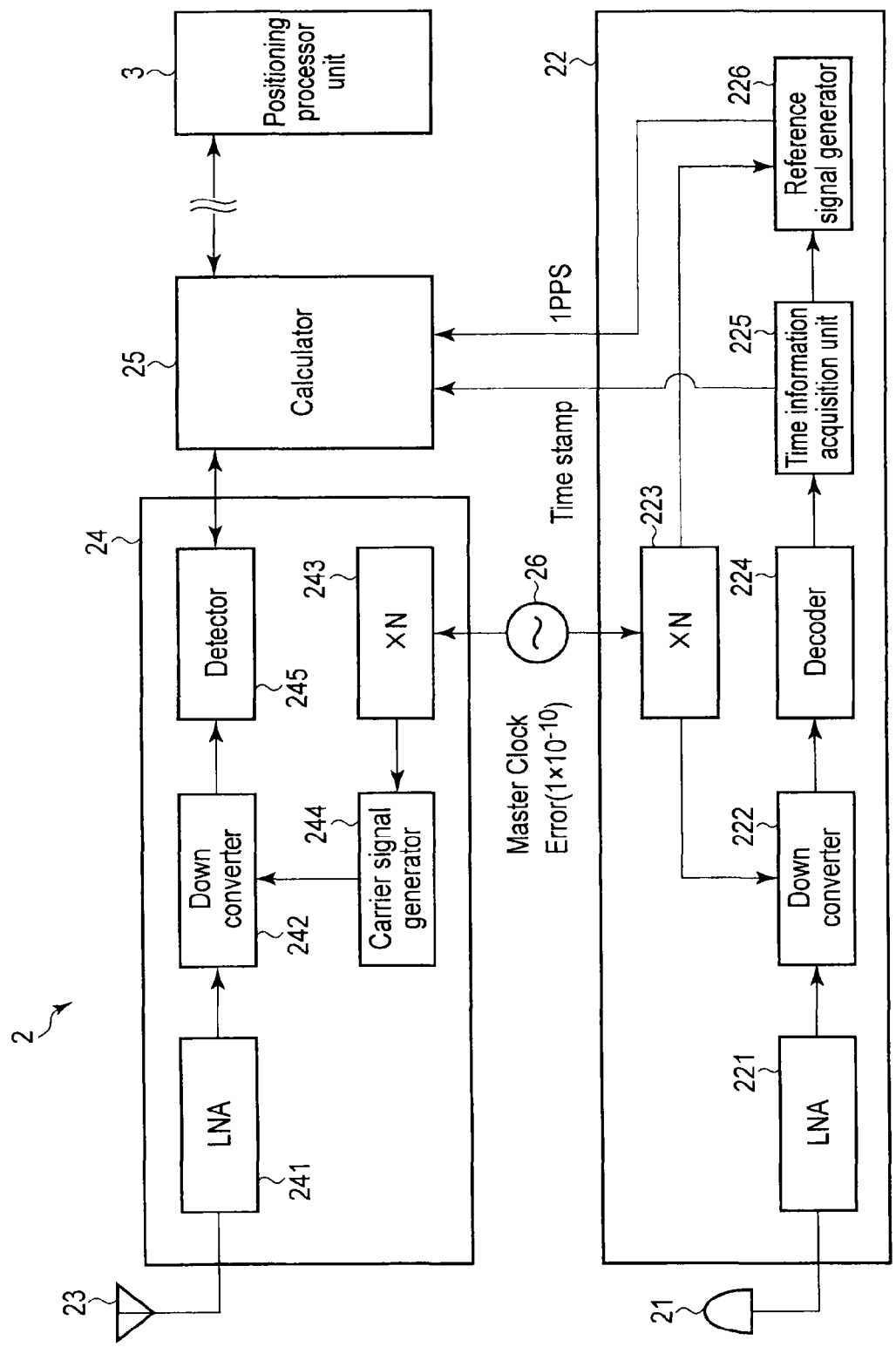
FIG. 3 is a functional block diagram showing an example of a receiver apparatus 2 shown in FIG. 1.

FIG. 3 is a functional block diagram showing an example of the receiver apparatus 2 shown in FIG. 1. The receiver apparatus 2 includes the GPS receiver 22, the signal receiver 24, and a master clock 26. In the GPS receiver 22, the GPS signal picked up by the GPS antenna 21 is amplified by a low noise amplifier (LNA) 221. The amplified GPS signal is frequency-converted by a down converter 222 and decoded by a decoder 224.

A time information acquisition unit 225 acquires a time stamp from the decoded GPS signal. A reference signal generator 226 generates a 1 PPS signal based on the acquired time stamp. A precision clock from the master clock 26 is multiplied by N by a multiplier 223 and given to the down converter 222 and the reference signal generator 226.

The signal receiver 24 includes the receiving antenna 23, a low noise amplifier (LNA) 241, a down converter 242, a multiplier 243, a carrier signal generator 244, and the detector 245.

A reflected wave from a target is picked up by the receiving antenna 23 and converted into an excitation signal. The excitation signal is amplified by the low noise amplifier (LNA) 241 and output to the down converter 242.

The carrier signal generator 244 generates a carrier signal using the clock from the multiplier 243, which is derived from the precision clock of the master clock 26, and supplies the carrier signal to the down converter 242. The down converter 242 down-converts the reception signal into a predetermined frequency (for example, baseband) using the supplied carrier signal. The detector 245 detects the output from the down converter 242, and outputs the detected reception signal to the calculator 25.

In the positioning system, time synchronization in the respective sites (transmission site and reception site) is essential. In the above-described arrangement, the master clock 15 is shared between the signal transmitter 13 and the GPS receiver 12. The master clock 26 is shared between the signal receiver 24 and the GPS receiver 22.

That is, the common master clocks are used for up conversion in the signal transmitter 13, down conversion in the signal receiver 24, and GPS observation. A rubidium oscillator or cesium oscillator is used as the master clocks 15 and 26. This can implement a frequency accuracy (about $1 \times 10^{-10}$) higher than a normal oven-controlled crystal oscillator (OCXO).

This makes it possible to reduce phase errors and time errors between the GPS receiver 12 and the signal transmitter 13 and reduce phase errors and time errors between the GPS receiver 22 and the signal receiver 24. When the radio wave transmission timing is generated using the 1 PPS signal radiated from the GPS satellite, time errors of radio waves radiated from each site can be reduced. Note that in a case where the time of the transmission site and the time of the reception site synchronize, and the radio wave transmission time interval is predetermined, transmission time information can be added to the reception signal on the receiver apparatus side. Setting of a time filter will be described next in detail with reference to FIGS. 4 and 5.

FIG. 4 is a view for explaining a Doppler frequency. The calculator 25 receives a pulse to be tracked, and calculates a Doppler frequency and a next assumed time difference Ota. As shown in FIG. 4, the Doppler frequency $\Delta f$ is positive (+) in the direction from a receiver apparatus Rx to a target T. For example, the Doppler frequency is given by $$\Delta f = f_T - f_{Rx}, \qquad (1)$$

Figure 5:
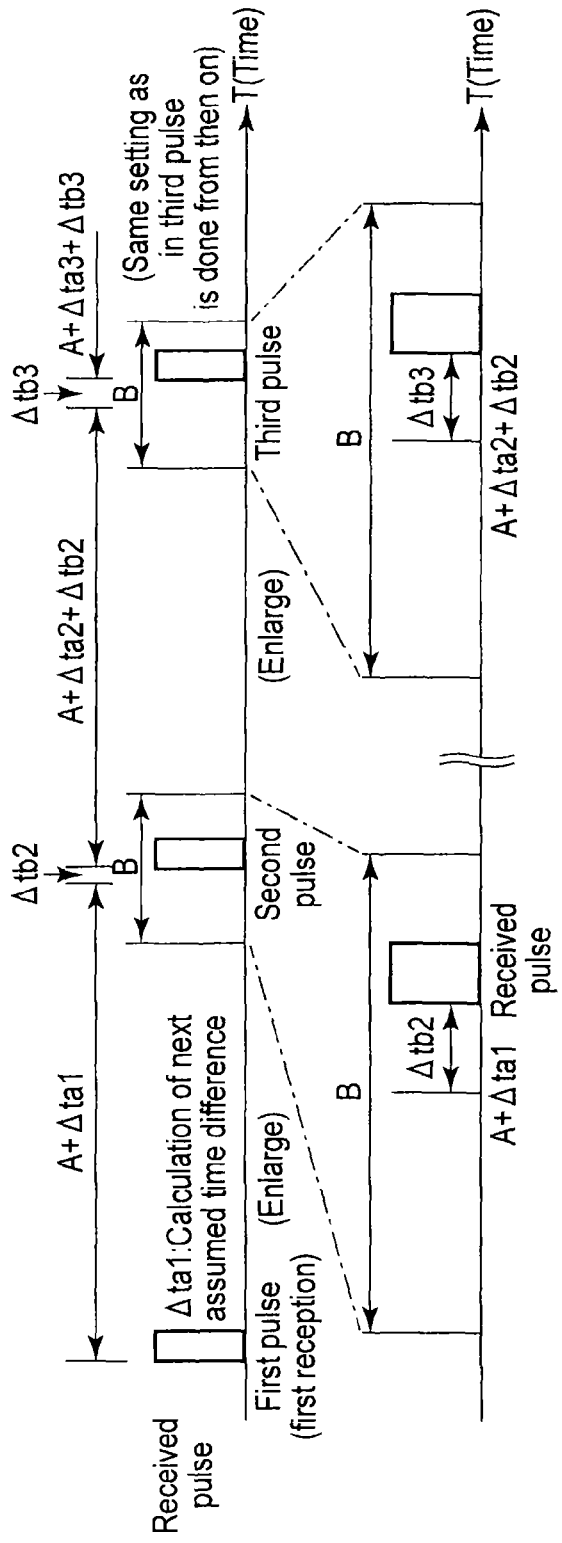
FIG. 5 is a timing chart for explaining a time filter setting method.

$f_R$: reception frequency of the reflected wave from the target in the receiver apparatus Rx $f_T$: transmission frequency (known) of the radio wave that has arrived from the target T FIG. 5 is a timing chart for explaining a time filter setting method. First, the assumed reception time of the next pulse is estimated from the reception time of the first pulse to be tracked. The assumed reception time of the second pulse is represented by "A (transmission time interval)+Δta1". Using the Doppler frequency Δf, the next assumed time difference Δta can be obtained by $$\Delta ta = 2/\Delta f \tag{2}$$

The detector 245 sets a time filter interval B with respect to the assumed reception time "A+Δta1" of the second pulse as the center. That is, the gate of a time width B is set. The next pulse (second pulse) is received within the period of the gate.

The next assumed time difference Δta2 is calculated from the Doppler frequency of the second pulse. In addition, a time difference Δtb between the assumed radio wave arrival time and the actual radio wave arrival time is calculated from the difference between the assumed reception time "A+Δta1" and the actual reception time of the second pulse.

From the third pulse, the assumed reception time is set to A+Δta+Δtb. The assumed reception time of the third pulse is A+Δta2+Δtb2. That is, from the reception time of the third pulse, Δta and Δtb are estimated from the immediately preceding received pulse, and the next assumed pulse reception time is set.

It is possible to track a received pulse and improve the pulse observation accuracy by repeating the above-described process. It is also possible to improve the reflected wave observation accuracy and remove the influence of a direct wave that arrives from the transmitter apparatus by using the time filter.

Hence, according to the embodiment, it is possible to implement a positioning system capable of raising the received pulse observation accuracy and efficiently tracking a target. When the radio wave transmission timing is generated using the 1 PPS signal radiated from the GPS satellite, time error components at each site can be reduced, and the time difference at each site can be made very small.

Note that the present invention is not limited to the above embodiment. For example, a bi-static system and a multi-static system have been exemplified in the embodiment. However, the concept of the present invention is applicable not only to these systems but also to an MLAT (Multi-lateration system) having the same reception method. In the MLAT as well, the time accuracy can be improved by using a high-performance master clock and sharing the clock in the signal receiver and the GPS receiver. It is therefore possible to improve the target observation accuracy.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A positioning system comprising:
   a transmitter apparatus configured to transmit a pulsed radio wave; and
   a receiver apparatus configured to receive a reflected wave from a target, wherein
   the transmitter apparatus comprises:
      a first GPS receiver configured to receive a GPS (Global Positioning System) signal and output a reference signal; and
      a transmitter configured to transmit the radio wave at a predetermined time interval based on the reference signal,
   the receiver apparatus comprises:
      a second GPS receiver configured to receive the GPS signal and output time information;
      a detector configured to receive the reflected wave and output a reception signal to which the received time information is added;
      a Doppler frequency calculator configured to calculate a Doppler frequency based on a reception frequency of the reception signal and a transmission frequency of the radio wave; and
      an arrival time difference calculator configured to calculate an arrival time difference of the reflected wave based on the Doppler frequency, and
   the detector sets a time filter to receive a next pulse based on the arrival time difference and the time information added to the reception signal.

2. The positioning system of claim 1, further comprises a first master clock shared between the first GPS receiver and the transmitter.

3. The positioning system of claim 1, further comprises a second master clock shared between the second GPS receiver and the detector.

4. A positioning method of causing a transmitter apparatus, comprising a first GPS receiver and a transmitter, to transmit a pulsed radio wave, causing a receiver apparatus, comprising a second GPS receiver and a detector, to receive a reflected wave from a target, and specifying a position of the target, the method comprising:
   receiving a GPS (Global Positioning System) signal and outputting a reference signal by the first GPS receiver;
   transmitting the radio wave at a predetermined time interval based on the reference signal by the transmitter apparatus;
   receiving the GPS signal and outputting time information by the receiver apparatus;
   receiving the reflected wave and outputting a reception signal to which the received time information is added, by the detector;
   calculating a Doppler frequency from a reception frequency of the reception signal and a transmission frequency of the radio wave by the receiver apparatus;
   calculating an arrival time difference of the reflected wave from the Doppler frequency by the receiver apparatus; and
   setting by the receiver apparatus a time filter to receive a next pulse based on the arrival time difference and the time information added to the reception signal.

5. The positioning method of claim 4, further comprising using a same master clock in the receiving by the transmitter apparatus and the transmitting by the transmitter apparatus to share a reference clock.

6. The positioning method of claim 4, further comprising using a same master clock in the receiving the GPS signal by the receiver apparatus and the receiving the reflected wave by the receiver apparatus to share a reference clock.

* * * * *